US 6,532,059 B2

(12) United States Patent
Shirai et al.

(10) Patent No.: US 6,532,059 B2
(45) Date of Patent: Mar. 11, 2003

(54) SURVEYING INSTRUMENT HAVING AN OPTICAL DISTANCE METER (75) Inventors: Masami Shirai, Saitama (JP); Kiyoshi Araki, Kanagawa (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/842,780

(22) Filed: Apr. 27, 2001

(65) Prior Publication Data

US 2001/0024270 A1 Sep. 27, 2001

(30) Foreign Application Priority Data

May 1, 2000 (JP) ........................................ 2000-132204

(51) Int. Cl.[7] .............................. G01C 3/00; G01C 3/08; G01C 5/00; G02B 5/22
(52) U.S. Cl. ...................... 356/3.04; 359/890
(58) Field of Search ................... 356/3.01–28; 359/890

(56) References Cited

U.S. PATENT DOCUMENTS

| | | | | |
|---|---|---|---|---|
| 3,464,770 A | * | 9/1969 | Schmidt | 356/4 |
| 3,759,614 A | * | 9/1973 | Harvey | 356/4 |
| 4,126,392 A | * | 11/1978 | House | 356/28.5 |
| 4,227,802 A | * | 10/1980 | Scholdstrom et al. | 356/5 |
| 4,257,704 A | * | 3/1981 | Yokota et al. | 356/8 |
| 4,518,255 A | * | 5/1985 | Zuleeg | 356/5 |
| 4,559,445 A | * | 12/1985 | Hedin et al. | 250/203 |
| 4,733,961 A | * | 3/1988 | Mooney | 356/5 |
| 5,144,498 A | * | 9/1992 | Vincent | 359/885 |
| 5,206,697 A | * | 4/1993 | Schwartz | 356/5 |
| 5,241,315 A | * | 8/1993 | Spinhirne | 342/54 |
| 5,337,056 A | * | 8/1994 | Dax | 342/128 |
| 5,517,297 A | * | 5/1996 | Stenton | 356/4.01 |
| 5,852,492 A | * | 12/1998 | Nimblett et al. | 356/5.04 |
| 5,880,822 A | * | 3/1999 | Kubo | 356/5.1 |
| 5,886,340 A | | 3/1999 | Suzuki et al. | |
| 5,886,777 A | | 3/1999 | Hirunuma | |
| 5,923,468 A | | 7/1999 | Tsuda et al. | |
| 5,949,548 A | | 9/1999 | Shirai et al. | |
| 6,072,642 A | | 6/2000 | Shirai | |
| 6,194,694 B1 | | 2/2001 | Shirai | |
| 6,275,283 B1 | * | 8/2001 | Hasson | 356/4.07 |

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

A surveying instrument includes an optical distance meter which has a light-transmitting optical system and a light-receiving optical system, the light-receiving optical system including a light-receiving element; a first wavelength selection filter and a second wavelength selection filter for allowing only light within a first wavelength range to pass therethrough, to be thereafter incident on the light-receiving element, wherein the first wavelength selection filter allows light with a wavelength equal to or greater than a first specific wavelength to pass therethrough, and a second wavelength selection filter allows light with a wavelength equal to or shorter than a second specific wavelength, which is longer than the first specific wavelength, to pass therethrough; and an angle adjusting device for adjusting an angle of inclination of the first and second wavelength selection filter with respect to an optical path thereof.

12 Claims, 7 Drawing Sheets

Amount of Shifting of Wavelength

Incident Angle

SURVEYING INSTRUMENT HAVING AN OPTICAL DISTANCE METER

BACKGROUND OF THE INVENTION

1. Field of the Invention

The present invention relates to a surveying instrument having an optical distance meter.

2. Description of the Related Art

A conventional surveying instrument such as a total station has a function to measure the distance between two points and also horizontal and vertical angles. Such a conventional surveying instrument generally measures the distance between two points with a distance meter, usually an electronic distance meter (EDM) incorporated in or attached to the surveying instrument.

The electronic distance meter incorporates an optical distance meter which calculates the distance from the phase-difference or the time difference between a measuring light (externally-projecting light), which is projected toward a target, and an internal reference light. The optical distance meter includes a light-transmitting optical system for transmitting a measuring light to the target via the objective lens of a sighting telescope provided as a component of the electronic distance meter, and a light-receiving optical system for receiving light reflected by the target. The light-receiving optical system includes a wavelength selection filter for reflecting the measuring light which is reflected by the target to be passed through the objective lens of the sighting telescope, toward a light receiving element. The measuring light and the internal reference light are alternately incident on the light receiving element during operation of the optical distance meter.

To improve the precision of the optical distance meter by increasing the signal-to-noise ratio (S/N) of a signal of a received light, the light receiving element preferably receives only the measuring light and the internal reference light. To this end, much attempt has been made to narrow the range of wavelengths of the light which is allowed by the wavelength selection filter to reflect thereby. However, it is technically difficult to produce such a wavelength selection filter which reflects only the light with a specific wavelength corresponding to the wavelength of the measuring light, while a wide variation in the light wavelength range of such a wavelength selection filter is inevitable due to manufacturing error. Therefore, the cost of production increases if such a wavelength selection filter is mass-produced. Furthermore, there are manufacturing tolerances in the production of the laser diode (LD) which is used as a light source for emitting the measuring light, and the wavelength of the measuring light emitted by the laser diode varies due to a change in temperature. Therefore, if the range of wavelengths of the light which is allowed by the wavelength selection filter to pass therethrough is very narrow, the laser diode cannot cope with variation of temperature.

SUMMARY OF THE INVENTION

The present invention has been devised in view of the problems noted above, and accordingly, an object of the present invention is to provide a surveying instrument having an optical distance meter, wherein the range of wavelengths of the light which is incident on the light receiving element provided as an element of the optical distance meter can be narrowed.

Another object of the present invention is to provide a surveying instrument having an optical distance meter, wherein the laser diode which emits the measuring light is unaffected by variation of temperature.

To achieve the objects mentioned above, according to an aspect of the present invention, a surveying instrument is provided, including an optical distance meter which includes a light-transmitting optical system for transmitting a measuring light toward an object, and a light-receiving optical system for receiving light reflected by the object, the light-receiving optical system including a light-receiving element; a first wavelength selection filter and a second wavelength selection filter, both positioned in front of the light-receiving element, for allowing only light within a first wavelength range between a first wavelength and a second wavelength to pass therethrough, to be thereafter incident on the light-receiving element, wherein the first wavelength selection filter allows light with a wavelength equal to or greater than the first wavelength to pass therethrough, and a second wavelength selection filter allows light with a wavelength equal to or shorter than the second wavelength, which is longer than the first specific wavelength, to pass therethrough; and an angle adjusting device for adjusting an angle of inclination of each of the first wavelength selection filter and the second wavelength selection filter with respect to an optical path in which the first wavelength selection filter and the second wavelength selection filter are positioned.

In an embodiment, the surveying instrument further includes a sighting telescope, wherein the light-transmitting optical system transmits the measuring light via an objective lens of the sighting telescope, and the light-receiving optical system receives the light reflected by the object via the objective lens of the sighting telescope. The light-receiving optical system further includes a main filter which reflects only a portion of light, within a second wavelength range, which is reflected by the object and passed through the objective lens, wherein a remaining portion of the light reflected by the object and passed through the objective lens is passed through the main filter; and a reflecting element which reflects the portion of light reflected by the main filter to be eventually incident on the light-receiving element. The first wavelength range is narrower than the second wavelength range.

In an embodiment, the first wavelength selection filter and the second wavelength selection filter are respectively formed on a first filter plate and a second filter plate which are separate from each other, the angle adjusting device being provided for each of the first filter plate and the second filter plate.

In an embodiment, the first wavelength selection filter and the second wavelength selection filter are respectively formed on front and rear surfaces of a common filter plate, the angle adjusting device being provided for the common filter plate.

In an embodiment, the light-transmitting optical system includes a laser diode which emits the measuring light. The surveying instrument further includes a temperature sensor which senses a temperature of the laser diode, and a controller which controls the angle adjusting device to adjust the angle of inclination of at least one of the first wavelength selection filter and the second wavelength selection filter in accordance with the temperature sensed by the temperature sensor. According to this construction, the first and second wavelength selection filters can be automatically set to predetermined inclination angles in accordance with a variation in the wavelength of the measuring light emitted by the laser diode due to a change in temperature.

The measuring light can be light having a specific wavelength in the range of visible light or outside the range of visible light.

In an embodiment, the optical distance meter includes a collimating lens and a condenser lens, the first and second wavelength selection filters being positioned between the collimating lens and the condenser lens.

Preferably, the optical distance meter further includes an ND filter positioned in front of the collimating lens.

In an embodiment, the reflecting element is made of a parallel-plate mirror having front and rear surfaces parallel to each other, wherein the front surface faces the objective lens and is formed as a light transmitting mirror. The rear surface faces the main filter and is formed as a light receiving mirror.

The present disclosure relates to subject matter contained in Japanese Patent Application No.2000-132204 (filed on May 1, 2000) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

FIGS. 1 through 9 show the first embodiment of an electronic distance meter (EDM) according to the present invention. This electronic distance meter incorporates an autofocus distance-measuring system, and can be incorporated in or attached to a surveying instrument such as a total station. Firstly, the overall structure of the electronic distance meter will be hereinafter discussed.

Figure 1:
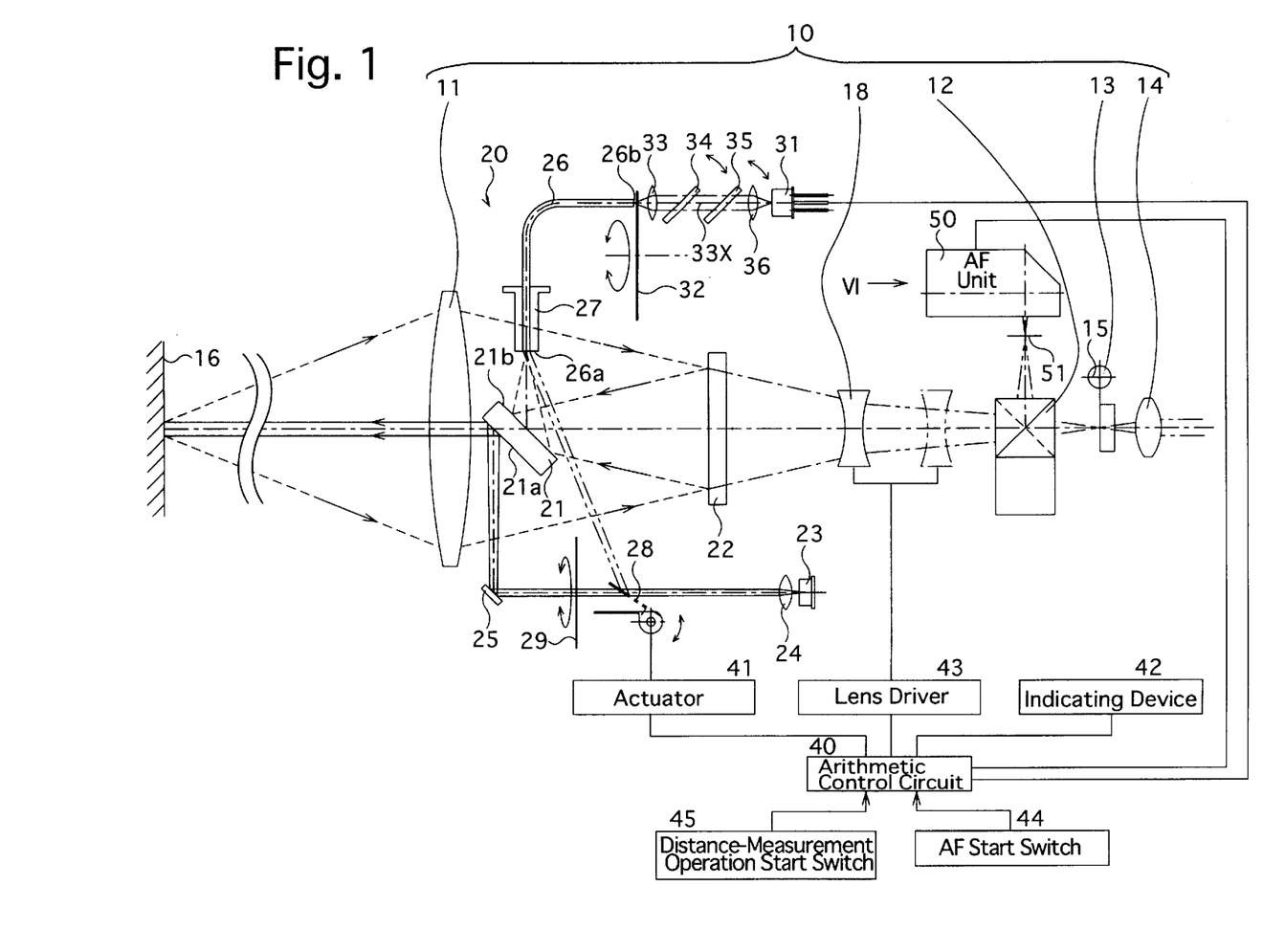
FIG. 1 is a schematic diagram of the first embodiment of an electronic distance meter according to the present invention.

The electronic distance meter is provided with a sighting telescope 10 and an optical distance meter 20. As shown in FIG. 1, the sighting telescope 10 is provided with an objective lens 11, a focusing lens 18, a Porro prism (an erecting optical system) 12, a focal-plane plate (a reticle plate) 13, and an eyepiece lens 14, in that order from the object side (i.e., left to right as viewed in FIG. 1). The focal-plane plate 13 is provided thereon with a reticle (cross hair) 15. The focusing lens 18 is guided in the direction of the optical axis thereof. The image of an object (sighting object) 16 that is formed through the objective lens 11 can be precisely focused on the front surface (the surface facing the objective lens 11) of the focal-plane plate 13 by adjusting the axial position of the focusing lens 18 in accordance with the distance of the sighting object 16 with respect to the sighting telescope 10. The user (surveyor) of the electronic distance meter sights a magnified image of the sighting object 16, which is focused on the focal-plane plate 13, via the eyepiece 14.

The electronic distance meter is provided, behind the objective lens 11 of the sighting telescope 10, with a light transmitting/receiving mirror (reflecting element) 21 and a wavelength selection filter (wavelength selection main filter) 22, which are arranged in that order from the object side. The light transmitting/receiving mirror 21 and the wavelength selection filter 22 are optical elements of a light-receiving optical system of the optical distance meter 20. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection filter 22 is formed as a light receiving mirror 21b.

The optical distance meter 20 is provided with a light-emitting element 23 which emits light (measuring light) having a specific wavelength. The measuring light emitted from the light-emitting element 23 is incident on the light transmitting mirror 21a via a collimating lens 24 and a fixed mirror 25. The measuring light is then reflected by the light transmitting mirror 21a to proceed toward the sighting object 16 along the optical axis of the objective lens 11. The collimating lens 24, the fixed mirror 25 and the light transmitting mirror 21a (light transmitting/receiving mirror 21) are optical elements of a light-transmitting optical system of the optical distance meter 20.

Figure 9:
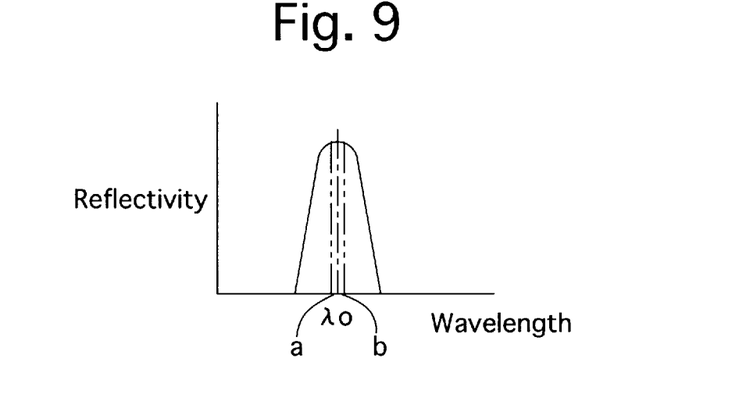
FIG. 9 is a graph showing the relationship between the reflectivity of a wavelength selection main filter and the wavelength $\lambda$ of the light incident on the wavelength selection main filter.

The majority of visible light can pass through the wavelength selection filter 22, and the measuring light which is reflected by the sighting object 16 to be passed through the objective lens 11 is reflected back to the light receiving mirror 21b by the wavelength selection filter 22. Thereafter, the light receiving mirror 21b reflects the incident measuring light so as to make the measuring light enter at an incident end surface 26a of a light receiving optical fiber 26. A fiber holder 27 supports the incident end of the light receiving optical fiber 26 which has the incident end surface 26a. The fiber holder 27 is immovably supported together with the light transmitting/receiving mirror 21 by a fixing device (not shown) provided in a space behind the objective lens 11. FIG. 9 is a graph showing the relationship between the reflectivity of the wavelength selection filter 22 and the wavelength $\lambda 0$ of the light incident on the wavelength selection filter 22, by way of example. As can be seen in this graph, the wavelength selection filter 22 reflects the light with wavelengths shown by a solid line in the neighborhood of wavelength $\lambda 0$. In the illustrated embodiment, the light-emitting element 23 is a laser diode (LD) which is designed to emit light with the specific wavelength $\lambda 0$ as the measuring light in the range of visible light.

The electronic distance meter is provided on a distance-measuring optical path between the light-emitting element 23 and the fixed mirror 25, with a switching mirror 28 and a first ND filter (light-transmitting filter) 29. The measuring light emitted by the light-emitting element 23 is incident on the fixed mirror 25 when the switching mirror 28 is retracted from the optical path between the collimating lens 24 and the fixed mirror 25, and the measuring light (internal reference light) emitted by the light-emitting element 23 is reflected by the switching mirror 28 to be incident directly on the incident end surface 26a of the light receiving optical fiber 26 when the switching mirror 28 is positioned in the optical path between the collimating lens 24 and the fixed mirror 25. The first ND filter 29 is used to adjust the amount of light of the measuring light incident on the sighting object 16.

Figure 2:
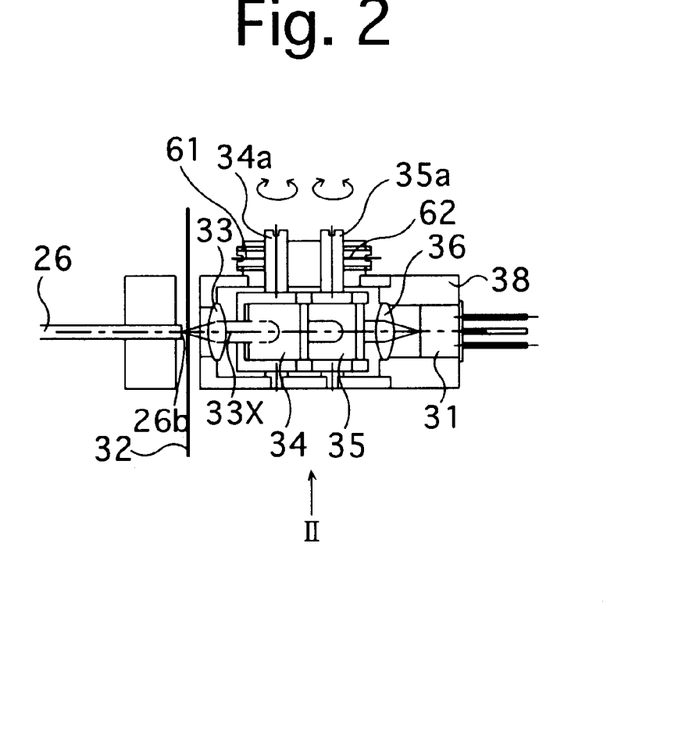
FIG. 2 is a cross sectional view of fundamental elements of an optical distance meter incorporated in the electronic distance meter shown in FIG. 1, showing a mechanism for adjusting the angle of inclination of each of a high-pass filter plate and a low-pass filter plate.
Figure 3:
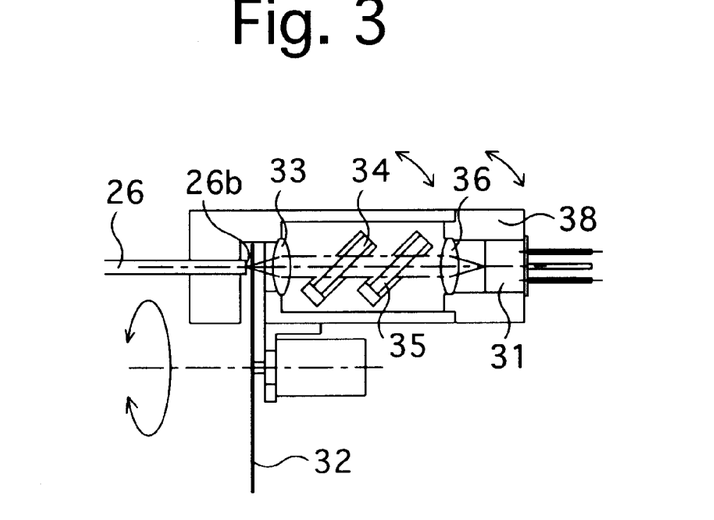
FIG. 3 is a cross sectional view of fundamental elements of the optical distance meter, viewed in the direction of an arrow II shown in FIG. 2.

The electronic distance meter is provided between an exit end surface 26b of the light receiving optical fiber 26 and a light-receiving element 31 with a second ND filter (light-receiving filter) 32, a collimating lens 33, a high-pass filter plate (first wavelength selection filter/first wavelength selection sub-filter) 34, a low-pass filter plate (second wavelength selection filter/second wavelength selection sub-filter) 35 and a condenser lens 36, in that order from the exit end surface 26b to the light-receiving element 31. The measuring light emitted from the exit end surface 26b of the light receiving optical fiber 26 is collimated through the collimating lens 33, so that the measuring light which travels from the exit surface of the collimating lens 33 to the incident surface of the condenser lens 36 is collimated light. As shown in FIGS. 2 and 3, the collimating lens 33, the high-pass filter plate 34, the low-pass filter plate 35, the condenser lens 36 and the light-receiving element 31 are supported by a holder (supporting member) 38. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

Figure 4:
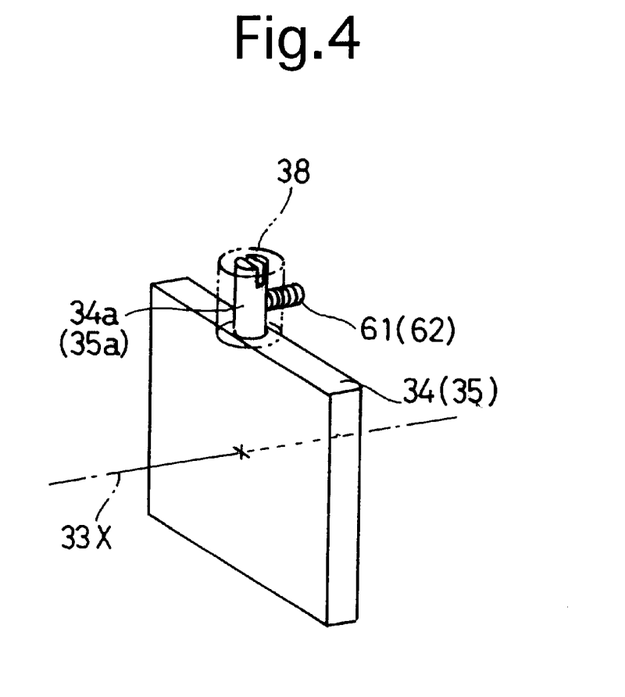
FIG. 4 is a perspective view of a filter plate (a high-pass filter plate or a low-pass filter plate) shown in FIGS. 2 and 3.
Figure 5:
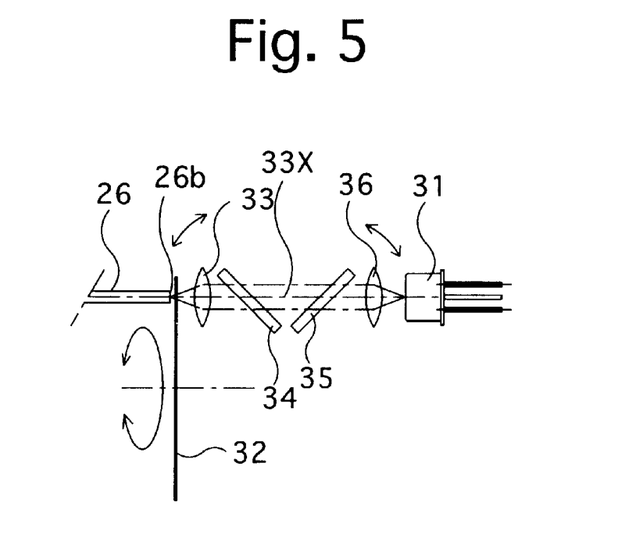
FIG. 5 is a fragmentary view of the electronic distance meter shown in FIG. 1, showing a state where the angle of inclination of the high-pass filter plate is changed.

As shown in FIGS. 2 through 4, a rotational shaft 34a, which extends perpendicular to an optical axis 33X extending from the collimating lens 33 to the condenser lens 36, is formed integral with the high-pass filter plate 34. The high-pass filter plate 34 is supported by the holder 38 therein to be rotatable about the rotational shaft 34a, namely, to be tiltable relative to the optical axis 33X by rotating the rotational shaft 34a. Similarly, a rotational shaft 35a which extends perpendicular to the optical axis 33X is formed integral with the low-pass filter plate 35. The low-pass filter plate 35 is supported by the holder 38 therein to be rotatable about the rotational shaft 35a, namely, to be tiltable relative to the optical axis 33X by rotating the rotational shaft 35a. The holder 38 is provided with set screws 61 and 62 which are screwed into the holder 38 at positions adjacent to the rotational shafts 34a and 35a to extend perpendicular to the rotational shafts 34a and 35a, respectively. The inner tips of the set screws 61 and 62 come into pressing contact with the rotational shafts 34a and 35a if the set screws 61 and 62 are tightened, so that the rotational shafts 34a and 35a are locked with respect to the holder 38 when the set screws 61 and 62 are tightened, respectively. Each of the high-pass filter plate 34 and the low-pass filter plate 35 is fixed to the holder 38 to be tilted by 45 degrees relative to the optical axis 33X in an initial condition. However, the angle of inclination of each of the high-pass filter plate 34 and the low-pass filter plate 35 can be adjusted, if necessary, by rotating the corresponding rotational shaft 34a or 35a with the corresponding set screw 61 or 62 being loosened. The rotational shaft 34a or 35a and the corresponding set screw 61 or 62 constitute an angle adjusting device. FIG. 5 shows a state where the high-pass filter plate 34 is tilted reversely as compared with the high-pass filter plate 34 shown in FIG. 1.

Figure 8:
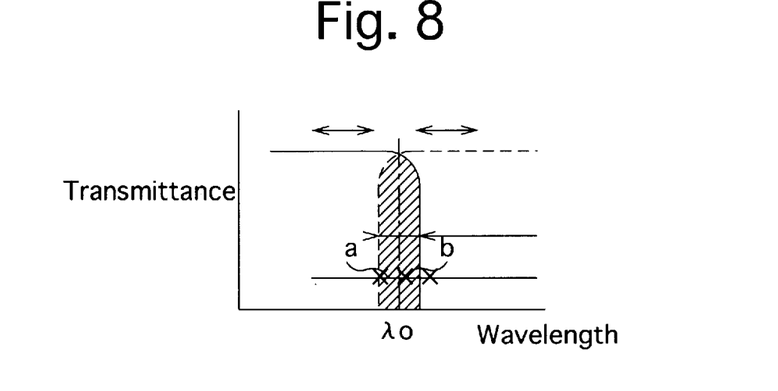
FIG. 8 is a graph showing the relationship between the transmittance of each of the high-pass filter plate and the low-pass filter plate and the wavelength $\lambda$ of the light which passes through each filter plate.

The high-pass filter plate 34 and the low-pass filter plate 35 function to narrow the range of wavelengths of the light which is reflected by the wavelength selection filter 22 to be incident on the light-receiving element 31, to the extend that the wavelength range spreads only in the immediate neighborhood of the wavelength $\lambda 0$. FIG. 8 is a graph showing the relationship between the transmittance of each of the high-pass filter plate 34 and the low-pass filter plate 35 and the wavelength $\lambda$ of the light which passes through the filter, by way of example. As shown by a broken line in the graph in FIG. 8, the high-pass filter plate 34 has a characteristic of allowing light with a long wavelength which is equal to or longer than a specific wavelength (first specific wavelength) which is shorter than a wavelength ($\lambda 0$) by a length "a", wherein the wavelength ($\lambda 0$) represents the central wavelength among the wavelengths of the light reflected by the wavelength selection filter 22. On the other hand, as shown by a solid line in the graph in FIG. 8, the low-pass filter plate 35 has a characteristic of allowing light with a short wavelength which is equal to or shorter than another specific wavelength (second specific wavelength) which is longer than the aforementioned central wavelength ($\lambda 0$) by a length "b". The wavelength range between the first specific wavelength and the second specific wavelength, which corresponds to the sum of the lengths "a" and "b" shown in FIG. 8, is narrower than the range of wavelengths of the light reflected by the wavelength selection filter 22. The wavelength range between the first specific wavelength and the second specific wavelength is shown as a shaded area in FIG. 8, while the same is shown as an area between two two-dot chain lines in FIG. 9. The wavelength range between the first specific wavelength and the second specific wavelength will be hereinafter referred to as "light-transmittable wavelength range."

Figure 7:
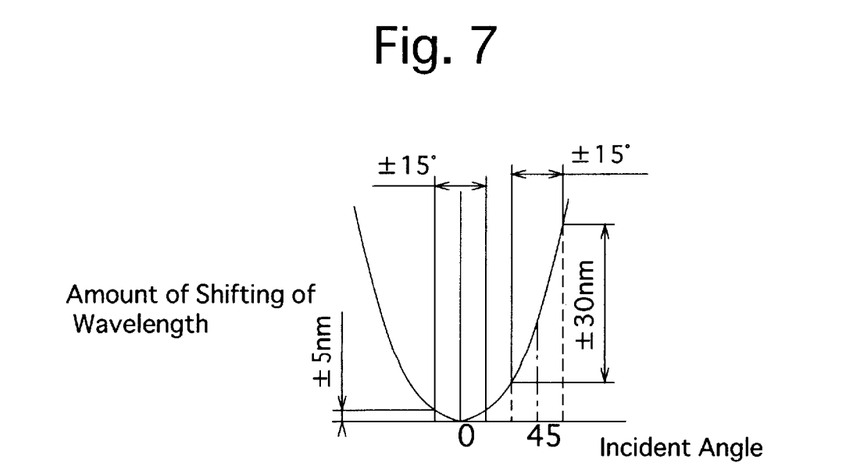
FIG. 7 is a graph showing the relationship between the incident angle of the light which is incident on one filter (the high-pass filter plate or the low-pass filter plate shown in FIG. 1) and the amount of shifting of wavelength of the light which is passed through this filter.

The light-transmittable wavelength range that is determined by the high-pass filter plate 34 and the low-pass filter plate 35 varies if the incident angle of the light which is incident on the filter plates 34 and 35 varies since the optical path length changes. Furthermore, the amount of shifting of wavelength of the light which is passed through one filter (34 or 35) per unit of variation of the incident angle becomes greater as the incident angle of the light which is incident on the filter (34 or 35) becomes greater. FIG. 7 is a graph showing the relationship between the incident angle of the light which is incident on one filter (34 or 35) and the amount of shifting of wavelength of the light which is passed through the filter (34 or 35). As can be seen in FIG. 7, although the light-transmittable wavelength range shifts only by ±5 nm even if the incident angle varies ±15 degrees from a state where the incident angle is 0 degree (i.e., where the filter (34 or 35) is positioned to extend perpendicular to the optical axis 33X), the light-transmittable wavelength range shifts by ±30 nm if the incident angle varies ±15 degrees from a state where the incident angle is 45 degrees (i.e., where the filter (34 or 35) is positioned to be inclined to the optical axis 33X by an angle of 45 degrees).

In the first embodiment of the electronic distance meter, through the use of such characteristics of the filter plates 34 and 35, each of the filter plates 34 and 35 is positioned to be inclined to the optical axis 33X by an angle of 45 degrees in a normal state. To make the filter plates 34 and 35 adaptable to variation of the wavelength of the measuring light emitted by the light-emitting element 23, the angle of each of the filter plates 34 and 35 can be adjusted in a manner as has been described above. Changing the angle of one of the filter plates 34 and 35 causes the corresponding critical wavelength thereof (i.e., the first or second specific wavelength) to vary, as shown by arrows in FIG. 8.

As known in the art, the optical distance meter 20 establishes two different states: one state wherein the measuring light emitted by the light-emitting element 23 is supplied to the fixed mirror 25, and another state wherein the same light (internal reference light) is directly supplied to the incident end surface 26a of the light receiving optical fiber 26, which are determined in accordance with the switching state of the switching mirror 28 driven by the arithmetic control circuit 40 via the actuator 41. As described above, the measuring light supplied to the fixed mirror 25 is projected toward the sighting object 16 via the light-transmitting mirror 21a and the objective lens 11, and the measuring light reflected by the sighting object 16 is incident on the incident end surface 26a via the objective lens 11, the wavelength selection filter 22, and the light receiving mirror 21b. Thereafter, both the measuring light reflected by the sighting object 16 to be eventually incident on the incident end surface 26a, and the internal reference light directly supplied to the incident end surface 26a via the switching mirror 28 are received by the light-receiving element 31. The arithmetic control circuit 40 detects the phase-difference between the projecting light and the reflected light and also the initial phase of the internal reference light, or the time difference between the projecting light and the reflected light, to calculate the distance from the electronic distance meter to the sighting object 16. The calculated distance is indicated by the indicating device 42. Such an operation of calculating the distance from the phase-difference or the time difference is well known in the art.

Figure 6:
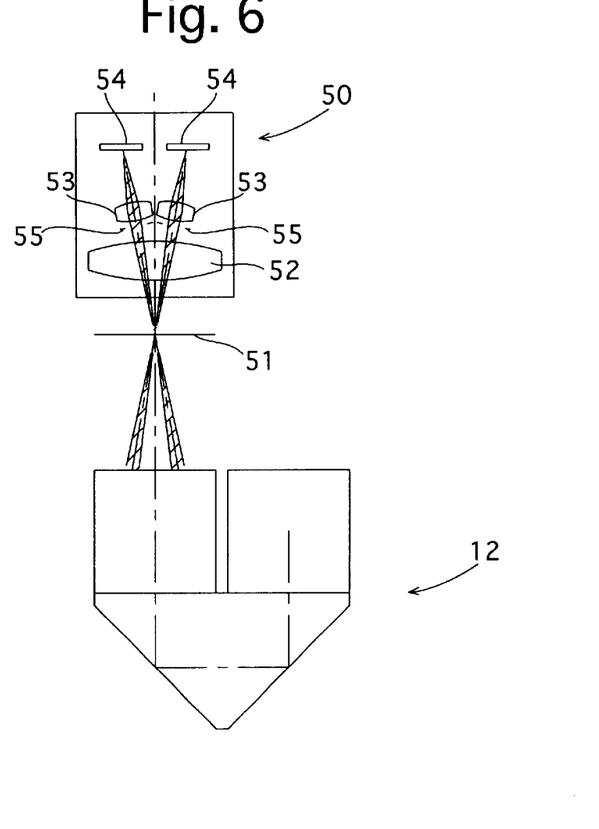
FIG. 6 is a conceptual diagram of a focus detecting device (an AF sensor unit/phase-difference detection type focus detecting device) and a Porro prism, as viewed in the direction of an arrow VI shown in FIG. 1.

The Porro prism 12 is provided with a beam splitting surface which splits the incident light bundle into two light bundles, so that one of the two light bundles proceeds toward a phase-difference detection AF sensor unit (focus detecting device) 50 while the other light bundle proceeds toward the eyepiece 14. Between the Porro prism 12 and the phase-difference detection AF sensor unit 50 is formed a reference focal plane 51 which is located at a position optically equivalent to the position at which the reticle 15 of the focal-plane plate 13 is placed. The phase-difference detection AF sensor unit 50 detects the focus state (i.e., the amount of defocus and direction of focal shift) on the reference focal plane 51. FIG. 6 shows a conceptual diagram of the phase-difference detection AF sensor unit 50 and the Porro prism 12. The phase-difference detection AF sensor unit 50 includes a condenser lens 52, a pair of separator lenses 53, a pair of separator masks 55 located in the close vicinity of the pair of separator lenses 53, and a pair of line sensors (e.g., multi segment CCD sensors) 54 located behind the respective separator lenses 53. The pair of separator lenses 53 are arranged apart from each other by the base length. The image of the sighting object 11 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the focusing lens 18 to bring the sighting object into focus via a lens driver 43 (see FIG. 1) in accordance with the calculated amount of defocus. The defocus operation is well-known in the art. An AF start switch 44 and a distance-measurement operation start switch 45 are connected to the arithmetic control circuit 40. The electronic distance meter having the above described structure performs a distance measuring operation in a manner such as described in the following description.

In the first step, a surveyor (user) aims the sighting telescope 10 at the sighting object 16 so that the optical axis of the sighting telescope 10 is generally in line with the sighting object 16, while viewing the sighting object 16 through a collimator (not shown) which is attached to the sighting telescope 10. In the second step, the surveyor depresses the AF start switch 44 to perform the aforementioned autofocus operation to move the focusing lens 18 to an in-focus position (in-focus state) thereof relative to the sighting object 16. In the third step, in a state where the sighting telescope 10 is in focus relative to the sighting object 16, the surveyor adjusts the direction of the sighting telescope 10 so that the reticle (cross hair) 15 viewed through the eyepiece 14 is precisely centered on the sighting object 16 while looking into the eyepiece 14. In the fourth step, the surveyor depresses the distance-measurement operation start switch 45 to perform the above-described distance-calculating operation, wherein the calculated distance is indicated on the indicating device 42.

According to the above described distance measuring operation, the measuring light which is firstly reflected by the sighting object 16, and is subsequently reflected by the wavelength selection filter 22 passes through the high-pass filter plate 34 and the low-pass filter plate 35. Therefore, the range of wavelengths of the light which is incident on the light-receiving element 31 spreads only in the immediate neighborhood of the wavelength λ0. Namely, any light as noise is not incident on the light-receiving element 31, which makes it possible to measure the distance from the electronic distance meter to the sighting object 16 precisely.

If the wavelength of the measuring light emitted by the light-emitting element 23 varies due to a change in temperature or other factors, the angle of one or both of the high-pass filter plate 34 and the low-pass filter plate 35 is adjusted so that only the narrowed range of wavelengths of light with the varied wavelength can be incident on the light-receiving element 31. Namely, the aforementioned light-transmittable wavelength range that is shown as a shaded area in FIG. 8 can be varied by adjusting the angle of inclination of one or both of the high-pass filter plate 34 and the low-pass filter plate 35 by rotating one or both of the rotational shafts 34a and 35a with the corresponding set screw 61 or 62 being loosened, so that only the narrowed range of wavelengths of light with the varied wavelength can be made incident on the light-receiving element 31 in accordance with variation of the wavelength of the measuring light emitted by the light-emitting element 23.

Figure 10:
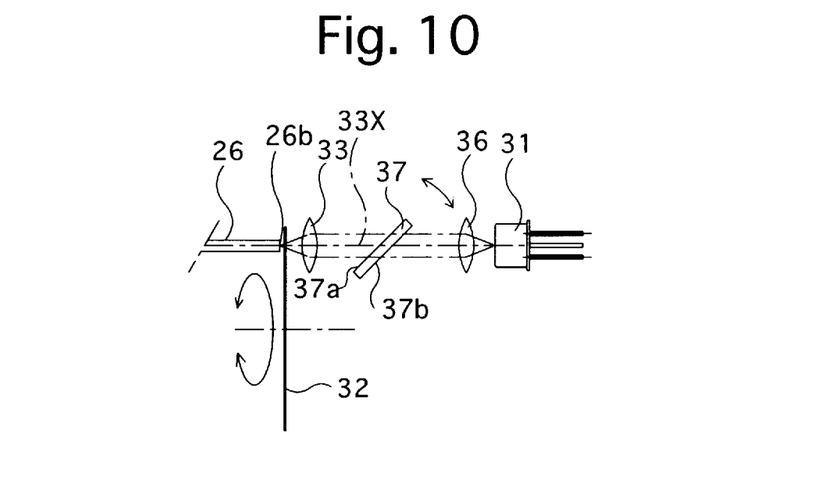
FIG. 10 is a fragmentary view of the second embodiment of the electronic distance meter according to the present invention, showing a filter plate which serves as an element of the optical distance meter of the electronic distance meter, and peripheral optical elements thereof.
Figure 11:
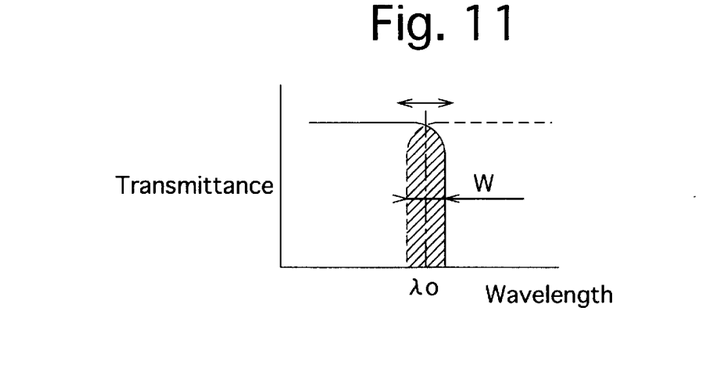
FIG. 11 is a graph showing the relationship between the transmittance of the filter plate shown in FIG. 10 and the wavelength $\lambda$ of the light which passes through the filter plate.

FIGS. 10 and 11 show the second embodiment of the electronic distance meter according to the present invention. The second embodiment of the electronic distance meter is identical to the first embodiment of the electronic distance meter except that two separate filter plates (34 and 35) are disposed between the collimating lens 33 and the condenser lens 36 in the first embodiment, whereas only one filter plate (37) is disposed between the collimating lens 33 and the condenser lens 36 in the second embodiment. Accordingly, only the filter plate (37) and peripheral optical elements thereof are shown in FIG. 10.

The second embodiment of the electronic distance meter is provided between the collimating lens 33 and the condenser lens 36 with a filter plate (wavelength selection sub-filter/common filter plate) 37 which is positioned to be inclined to the optical axis 33X by an angle of 45 degrees in a normal state, similar to each of the high-pass filter plate 34 and the low-pass filter plate 35 of the first embodiment. Furthermore, the filter plate 37 is structured and supported so that the angle of inclination thereof can be adjusted in a manner similar to each of the high-pass filter plate 34 and the low-pass filter plate 35 of the first embodiment. The filter plate 37 is provided on one and the other surfaces thereof with a high-pass filter (first wavelength selection filter/first wavelength selection sub-filter) 37a and a low-pass filter (second wavelength selection filter/second wavelength selection sub-filter) 37b which correspond to the high-pass filter plate 34 and the low-pass filter plate 35, respectively of the first embodiment. In the second embodiment, as shown in FIG. 11, the light-transmittable wavelength range that is shown as a shaded area in FIG. 11 can be shifted by adjusting the angle of inclination of the filter plate 37, so that only the narrowed range of wavelengths of light with the varied wavelength can be made incident on the light-receiving element 31 in accordance with variation of the wavelength of the measuring light emitted by the light-emitting element 23. In the second embodiment, the light-transmittable wavelength range (indicated by "W" shown in FIG. 11) is constant. Other structures of the second embodiment are identical to those of the first embodiment of the electronic distance meter.

Figure 12:
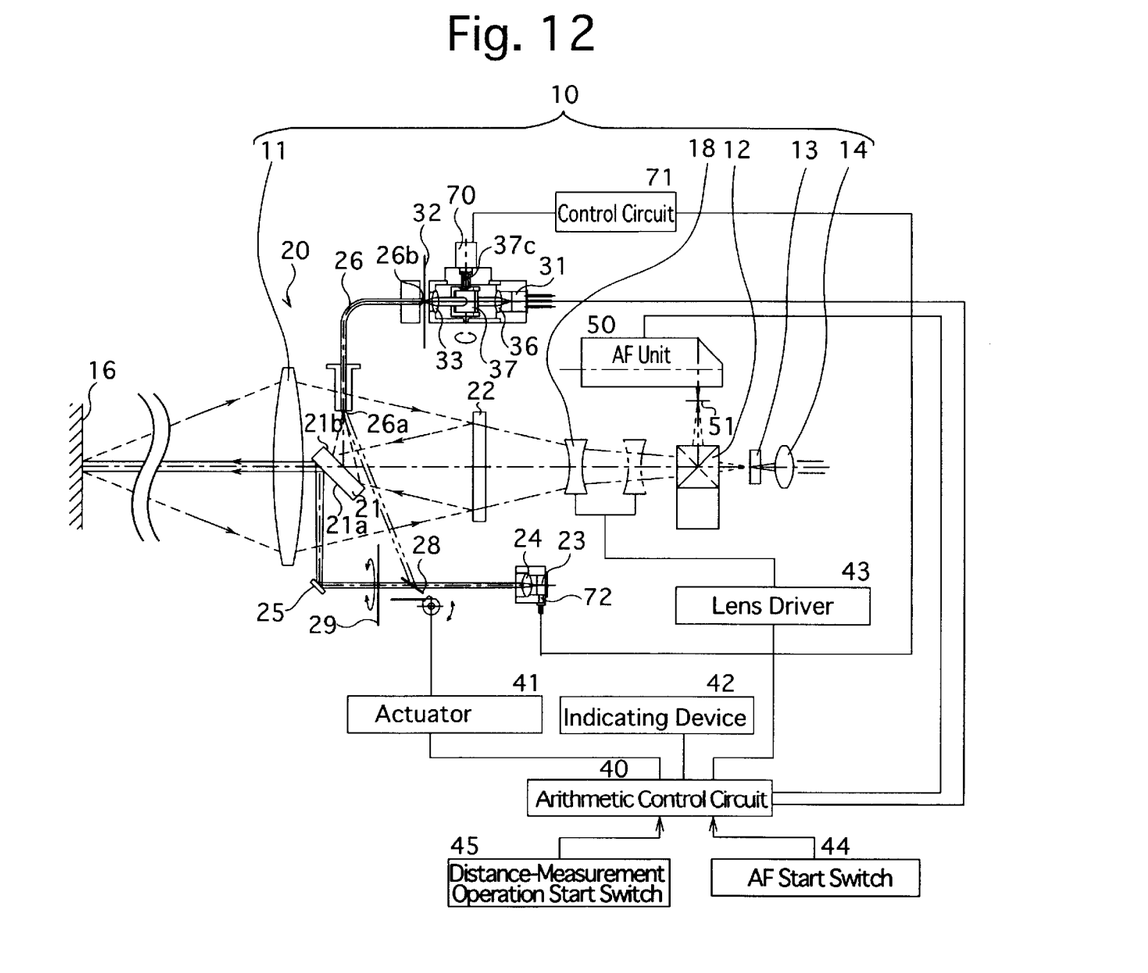
FIG. 12 is a view similar to that of FIG. 1 and illustrates the third embodiment of the electronic distance meter according to the present invention.
Figure 13:
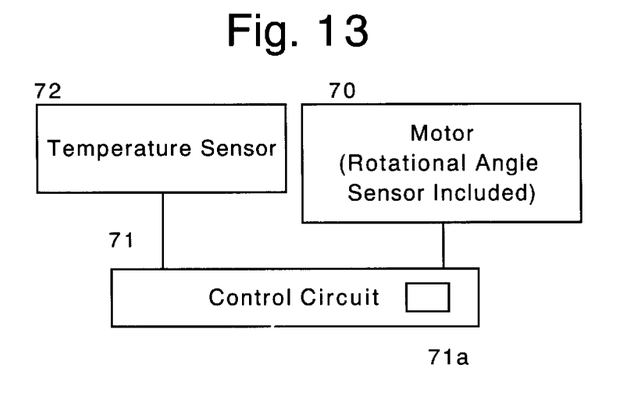
FIG. 13 is a block diagram of a control system for controlling the third embodiment of the electronic distance meter shown in FIG. 12.
Figure 14:
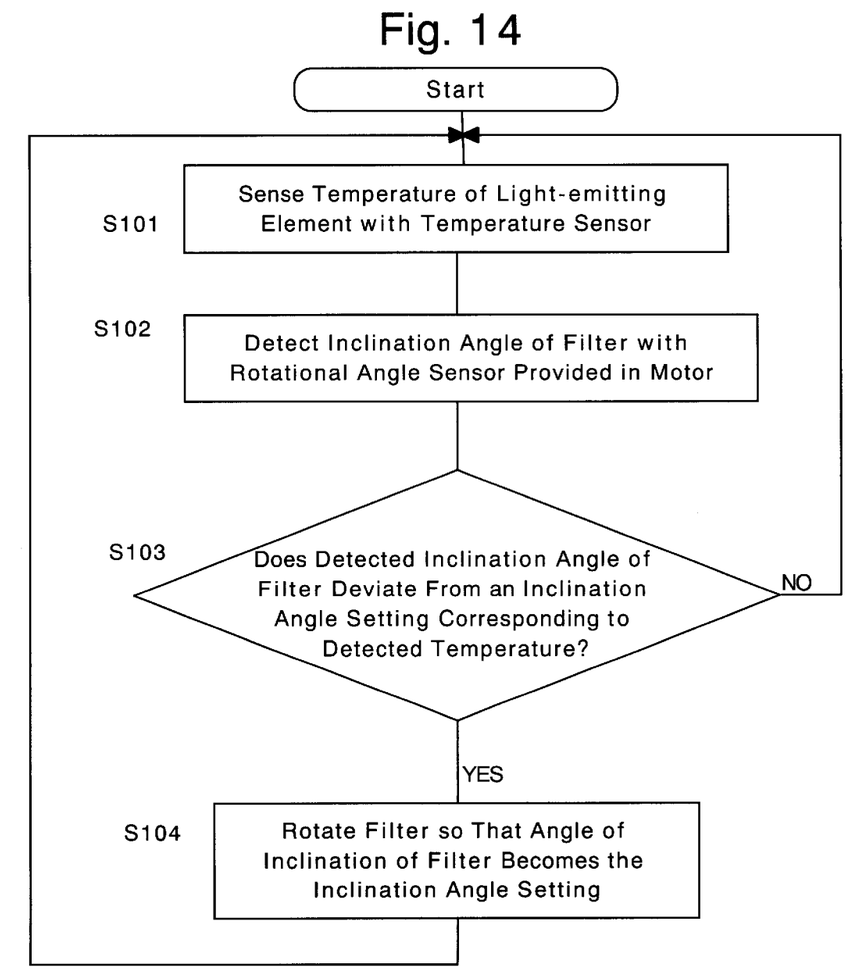
FIG. 14 is a flow chart showing a filter angle adjustment operation.

FIGS. 12 through 14 show the third embodiment of the electronic distance meter according to the present invention. The third embodiment is identical to the first embodiment in many respects, so that elements or parts of the third embodiment which are identical to those of the first embodiment are designated by the same reference numerals. Similar to the second embodiment, only one filter plate is disposed between the collimating lens 33 and the condenser lens 36. More specifically, a filter plate (wavelength selection sub-filter) 37 which is provided on one and the other surfaces thereof with a high-pass filter 37a and a low-pass filter 37b which correspond to the high-pass filter plate 34 and the low-pass filter plate 35, respectively, is disposed between the collimating lens 33 and the condenser lens 36. The third embodiment is characterized in that the temperature of the light-emitting element 23 is sensed periodically while the angle of inclination of the filter plate 37 is adjusted automatically in accordance with variation of the wavelength of the measuring light emitted by the light-emitting element 23 at the sensed temperature.

A rotational shaft 37c which is similar to the rotational shaft (34a or 35a) of the high-pass filter plate 34 or 35 is formed integral with the filter plate 37. The rotational shaft 37c is coupled to the rotary drive shaft of a motor 70 which incorporates a rotational angle sensor (encoder) so that the filter plate 37 can be driven to rotate about the rotational shaft 37c by rotation of the motor 70. The motor 70 and the rotational shaft 37c constitute an angle adjusting device. The motor 70 is connected to a control circuit (controller) 71. The light-emitting element 23 is provided therein with a temperature sensor 72 which is connected to the control circuit 71.

FIG. 13 is a block diagram of a control system including the control circuit 71, the temperature sensor 72 and the motor 70. This control circuit 71 controls the motor 70 and the temperature sensor 72. The control circuit 71 is provided therein with a memory (storing device) 71a in which a data table listing of the values of a plurality of different temperatures of the light-emitting element 23 and a corresponding plurality of angles of tilting of the filter plate 37 to which the light-emitting element 23 emits the wavelength of the measuring light at the corresponding plurality of temperatures, respectively, is stored in advance.

The third embodiment operates in accordance with an operation shown by a flowchart in FIG. 14. The operation shown in FIG. 14 is performed by the control circuit 71. Firstly, the temperature of the light-emitting element 23 is sensed with the temperature sensor 72 (step S101). Subsequently, the angle of inclination of the filter plate 37 is detected with the rotational angle sensor provided in the motor 70 (step S102). Subsequently, it is determined whether the detected inclination angle of the filter plate 37 deviates from an inclination angle setting of the filter plate 37 in the aforementioned data table which corresponds to the sensed temperature of the light-emitting element 23, which is stored in the memory 71a (step S103). If it is determined at step S103 that the detected inclination angle of the filter plate 37 deviates from the inclination angle setting, the motor 70 is driven to rotate the filter plate 37 so that the angle of inclination thereof becomes the inclination angle setting (S104). If it is determined at step S103 that there is no deviation between the detected inclination angle of the filter plate 37 and the inclination angle setting, control returns to the operation at step S101 and repeats the operations from step S101 to step S104.

As can be understood from the above descriptions, according to the third embodiment even if the wavelength of the measuring light emitted by the light-emitting element 23 varies due to a change in temperature, the angle of inclination of the filter plate 37 is adjusted automatically so that only the light with the varied wavelength can be incident on the light-receiving element 31.

Although the angle of inclination of only one filter plate (37) is controlled in the third embodiment, the angles of inclination of two filter plates similar to the high-pass filter plate 34 and the low-pass filter plate 35 of the first embodiment can be controlled independently of each other. Furthermore, in the third embodiment, the control circuit 40 and the control circuit 71 can alternatively be provided as a single control circuit.

In each of the above described first, second and third embodiments, the optical distance meter 20 and the sighting telescope 10 use a common optical path. However, the optical distance meter 20 can be designed separate from the sighting telescope 10. Such a design is known in the art, and the present invention can be applied to such an optical distance meter. Namely, the wavelength selection filter 22 is not a fundamental element to achieve the present invention.

In each of the above described first, second and third embodiments, although one filter plate (37) or two filter plates (34 and 35) are positioned immediately in front of the light-receiving element 31, the filter plate or plates can be positioned immediately in front of the incident end surface 26a of a light receiving optical fiber 26.

In each of the above described first, second and third embodiments, although the angle of- inclination of one filter plate (37) or two filter plates (34 and 35) is adjusted to serve as a narrow-band filter, optical elements such as the light receiving mirror 21b and the wavelength selection filter 22 can be modified to serve as a narrow-band filter, wherein the receiving mirror 21b is provided with wavelength selection filter characteristics. In this case, the wavelength selection filter 22 serves as a first wavelength selection filter and the light receiving mirror 21b serves as a second wavelength selection filter.

As can be understood from the foregoing, according to the present invention, a surveying instrument having an optical distance meter in which the range of wavelengths of the light which is incident on the light receiving element of the optical distance meter can be narrowed can be achieved.

Furthermore, a surveying instrument having an optical distance meter can be achieved in which distance measurement is unaffected by a change in wavelength of measuring light emitted by a light-emitting element due to a change in temperature of the light-emitting element.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument comprising:
   an optical distance meter that includes a light-transmitting optical system that transmits a measuring light toward an object, and a light-receiving optical system that receives light reflected by said object, said light-receiving optical system comprising a light-receiving element;
   a first wavelength selection filter and a second wavelength selection filter, both being rotatable and positioned in front of said light-receiving element, that allow only light within a first wavelength range between a first wavelength and a second wavelength to pass therethrough, to be thereafter incident on said light-receiving element, said first wavelength selection filter allowing light with a wavelength which is one of equal to and longer than said first wavelength to pass therethrough, and a second wavelength selection filter allowing light with a wavelength which is one of equal to and shorter than said second wavelength, to pass therethrough, said second wavelength being longer than said first wavelength, said first wavelength selection filter and said second wavelength selection filter vary the width of the wavelength range of light passing therethrough; and
   an angle adjuster that adjusts an angle of inclination of each of said first wavelength selection filter and said second wavelength selection filter with respect to an optical path in which said first wavelength selection filter and said second wavelength selection filter are positioned.

2. The surveying instrument according to claim 1, further comprising a sighting telescope,
   wherein said light-transmitting optical system transmits said measuring light via an objective lens of said sighting telescope;
   wherein said light-receiving optical system receives said light reflected by said object via said objective lens of said sighting telescope;
   wherein said light-receiving optical system further comprises:
   a main filter which reflects only a portion of light, within a second wavelength range, which is reflected by said object and passed through said objective lens, wherein a remaining portion of said light reflected by said object and passed through said objective lens is passed through said main filter; and
   a reflecting element which reflects said portion of light reflected by said main filter to be eventually incident on said light-receiving element;
   wherein said first wavelength range is narrower than said second wavelength range.

3. The surveying instrument according to claim 1, wherein said first wavelength selection filter and said second wavelength selection filter are respectively formed on a first filter plate and a second filter plate which are separate from each other, said angle adjusting device being provided for each of said first filter plate and said second filter plate.

4. The surveying instrument according to claim 1, wherein said first wavelength selection filter and said second wavelength selection filter are respectively formed on front and rear surfaces of a common filter plate, said angle adjusting device being provided for said common filter plate.

5. The surveying instrument according to claim 1, wherein said measuring light comprises light with a specific wavelength in the range of visible light.

6. The surveying instrument according to claim 1, wherein said optical distance meter comprises a collimating lens and a condenser lens, said first and second wavelength selection filters being positioned between said collimating lens and said condenser lens.

7. The surveying instrument according to claim 6, wherein said optical distance meter further comprises a neutral density filter positioned in front of said collimating lens.

8. The surveying instrument according to claim 2, wherein said reflecting element is made of a parallel-plate mirror having front and rear surfaces parallel to each other,
   wherein said front surface faces said objective lens and comprises a light transmitting mirror; and
   wherein said rear surface faces said main filter and comprises a light receiving mirror.

9. The surveying instrument of claim 1, wherein the first wavelength selection filter and the second wavelength selection filter shift a center wavelength of light passing therethrough.

10. A surveying instrument comprising:
    an optical distance meter which includes a light-transmitting optical system comprising a laser diode for transmitting a measuring light toward an object, and a light-receiving optical system for receiving light reflected by said object, said light-receiving optical system comprising a light-receiving element;

a first wavelength selection filter and a second wavelength selection filter, both positioned in front of said light-receiving element, for allowing only light within a first wavelength range between a first wavelength and said second wavelength to pass therethrough, to be thereafter incident on said light-receiving element, wherein said first wavelength selection filter allows light with a wavelength which is one of equal to and greater than said first wavelength to pass therethrough, and a second wavelength selection filter allows light with a wavelength which is one of equal to and shorter than said second wavelength, which is longer than said first wavelength, to pass therethrough;

an angle adjusting device for adjusting an angle of inclination of each of said first wavelength selection filter and said second wavelength selection filter with respect to an optical path in which said first wavelength selection filter and said second wavelength selection filter are positioned;

a temperature sensor which senses a temperature of said laser diode; and a controller which controls said angle adjuster to adjust said angle of inclination of at least one of said fist wavelength selection filter and said second wavelength selection filter in accordance with said temperature sensed by said temperature sensor.

11. The surveying instrument of claim 10, therein the first wavelength selection filter and the second wavelength selection filter are rotatable and vary the width of the wavelength range of light passing therethrough.

12. The surveying instrument of claim 11, wherein the first wavelength selection filter and the second wavelength selection filter shift a center wavelength of light passing therethrough.

* * * * *